United States Patent [19]

Sbaschnigg et al.

[11] Patent Number: 4,961,326
[45] Date of Patent: Oct. 9, 1990

[54] MATERIAL PROCESSING SYSTEM

[75] Inventors: Johann Sbaschnigg; Franz Resch, both of Graz, Austria

[73] Assignee: Maschinenfabrik Andritz Actiengesellschaft, Graz, Austria

[21] Appl. No.: 199,239

[22] PCT Filed: Sep. 16, 1987

[86] PCT No.: PCT/AT87/00052

§ 371 Date: Jul. 13, 1988

§ 102(e) Date: Jul. 13, 1988

[87] PCT Pub. No.: WO88/02044

PCT Pub. Date: Mar. 24, 1988

[30] Foreign Application Priority Data

Sep. 17, 1986 [AT] Austria .................. 2487/86

[51] Int. Cl.$^5$ ............................. D06B 5/08
[52] U.S. Cl. .................... 68/9; 68/22 R; 68/44; 68/181 R; 68/200
[58] Field of Search ........... 8/156; 68/9, 22 R, 27, 68/44, 62, 158, 181 R, 200

[56] References Cited

U.S. PATENT DOCUMENTS

| | | | |
|---|---|---|---|
| 1,794,039 | 2/1931 | Silvano et al. | 68/9 X |
| 2,555,673 | 6/1951 | Beatty | |
| 3,203,207 | 8/1965 | Poncelet | |
| 3,292,397 | 12/1966 | Wooliever | 68/181 R X |
| 4,246,669 | 1/1981 | Davis | 68/181 R X |
| 4,324,116 | 4/1982 | Davis | 68/181 R X |

FOREIGN PATENT DOCUMENTS

| | | |
|---|---|---|
| 1801906 | 4/1970 | Fed. Rep. of Germany . |
| 1404114 | 5/1965 | France . |
| 00309 | 6/1979 | PCT Int'l Appl. . |
| 2115714 | 9/1983 | United Kingdom . |
| 2166660 | 5/1986 | United Kingdom . |

Primary Examiner—Philip R. Coe
Attorney, Agent, or Firm—Townsend and Townsend

[57] ABSTRACT

The invention relates to an apparatus for the treatment of a material, in particular a web of material or pulp, made to pass between at least two endless permeable belts, in particular screen belts or the like conveying means, in particular for the displacement washing of a filter cake or for washing fibrous matter, the material being passed between the belts along at least one, in particular at least two containers serving for the supply or discharge of a treatment medium. The object is in particular to reduce the construction length of such apparatus and to bring about a particular increase of the washing effect or other treatment effect, and this if possible without applying a vacuum. This object is achieved according to the invention by providing, in particular for a countercurrent treatment, advantageously for a countercurrent displacement washing, for the belts with the material lodged therebetween to be made to pass in approximately horizontal loops or undulations, at least one of these loops or the like being passed around a container or at least two or more of these loops or the like being passed from below individually around two or more of the containers and over at least one reversing roller, compression roller, through press nips or the like which are provided on at least one container side, in the case of two or more containers between these containers.

46 Claims, 2 Drawing Sheets

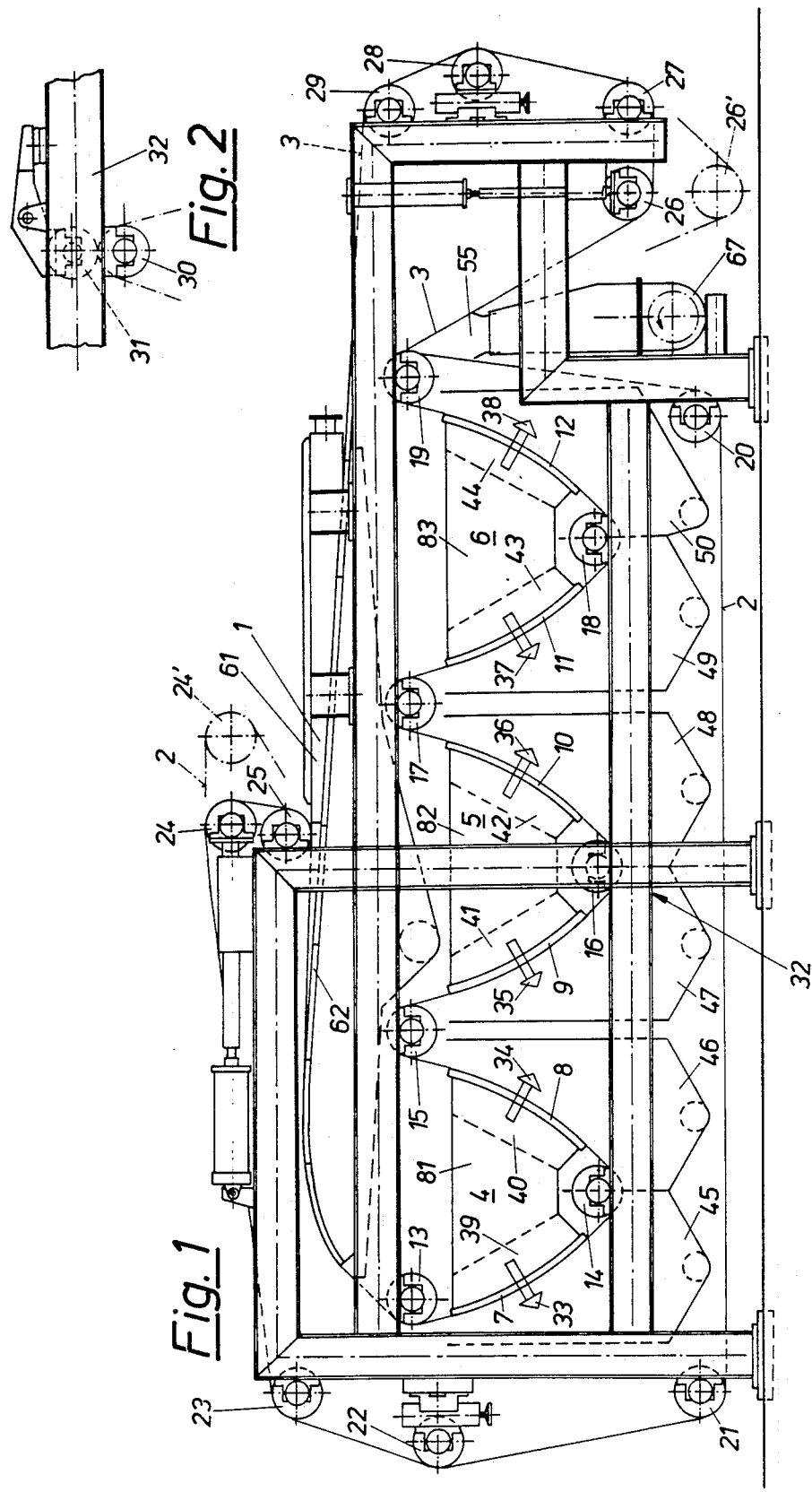

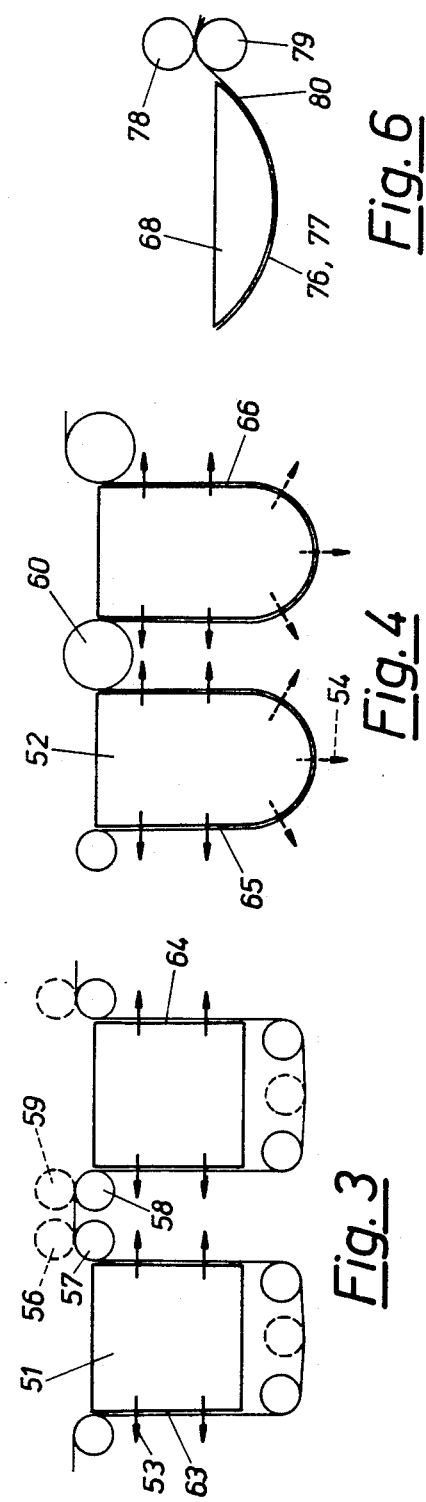
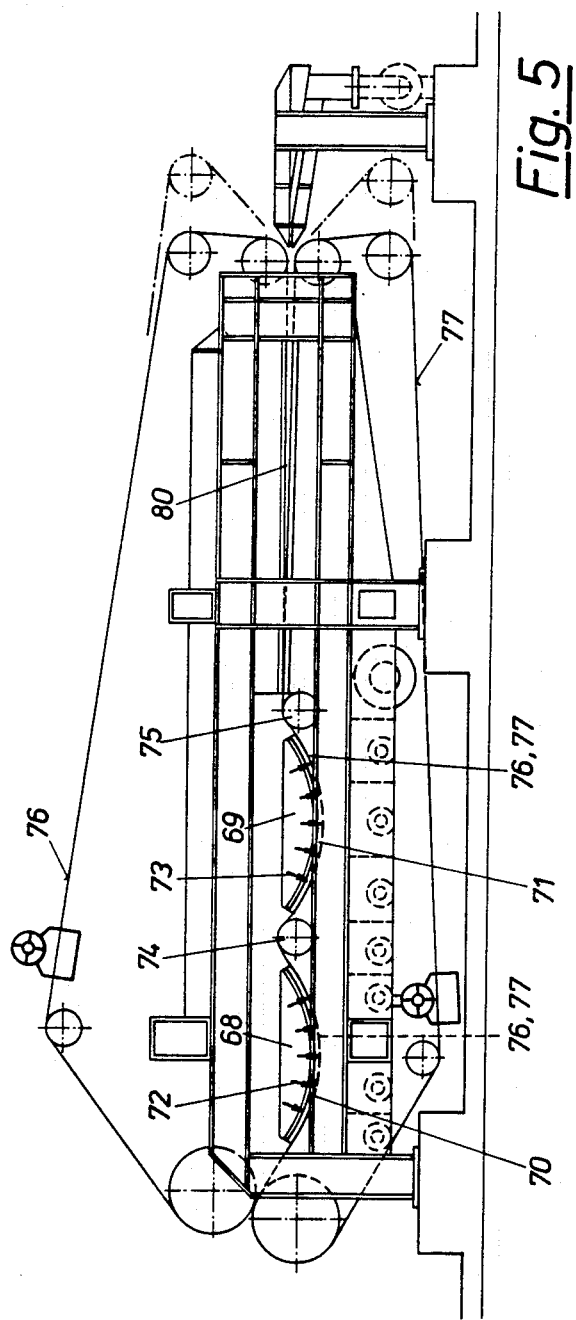

MATERIAL PROCESSING SYSTEM

The invention relates to an apparatus for the treatment of a material, in particular a web of material or pulp, made to pass between at least two endless permeable belts, in particular screen belts or the like conveying means, in particular for the displacement washing of a filter cake or for washing fibrous matter, the material being passed between the belts, conveniently after passing a compression zone, advantageously a wedge-shaped compression zone, along at least one, in particular at least two containers serving for the supply or discharge of a treatment medium, for instance a washing fluid, a bleaching agent or other chemicals, this (these) container(s) being provided on at least a portion of its (their) surface(s) facing the belts and the material with openings for the treatment fluid and the material, after passing the container(s), optionally being conveyed to a compression zone, and these containers optionally being arranged in series one behind the other and advantageously being connected to inlets and outlets for various treatment media, for instance water and/or bleaching chemicals, possibly of various parameters or values of state, for instance various concentrations or various pressures.

It is common to wash cellulosic pulp and semi-pulp on rotary drum washers and flat Fourdrinier-type "long screen" washers. It is a disadvantage of these systems that with rotary drum washers, several of these must be arranged in series and the "long screen" washers are bulky. Both systems use vacuum to compressed air necessitating high installation investments and causing high energy consumption in use. The washing performance is rather good, but due to the dilution factor that is e.g. in a range of from 1 to 3.5, the fresh water need for the washing is relatively high. The said systems use displacement washing zones connected in series and run under use of a countercurrent. Even gravity washers have been suggested.

According to the invention, the disadvantages previously described can be largely eliminated by providing, in particular for a countercurrent treatment, advantageously for a countercurrent displacement washing, that the belts with the material lodged therebetween are made to pass in approximately horizontal loops, undulatios or the like, at least one of these loops or the like being passed around a container and two or more of said loops or the like passed individually from below around two or more of the containers and over at least one reversing roller, compression roller, through press nips or the like which are arranged on at least one container side, in the case of two or more containers between said containers, the treatment fluid inthe container(s) optionally being pressurized so that it can flow through the container openings to the belts and the material under pressure. The loop- or undulation-shaped path of the belts and the material results in a considerable reduction of the construction length of such washing apparatus or the like. If a treatment fluid which is pressurized instead of under vacuum is used for the operation, a considerable saving in energy is obtained in addition. The degree of effectiveness of the washing operation is increased by the straining or squeezing achieved by means of the reversing rollers, compression rollers or press nips. Moreover, the requirement of fresh treatment fluid is considerable reduced.

Conveniently, the treatment containers are arranged in particular at about equal level spacially from one another and in travel direction of the belts one behind the other, reversing rollers, compression rollers or press nips advantageously being provided and the direction of material transport between the containers. The degree of effectiveness can be particularly increased by providing for the belts with the material to be made to pass along the lateral walls of the, in particular deep, containers which are provided in this area with openings for the treatment fluid, in particular for the discharge of the treatment fluid. But under certain circumstances, it is also possible to pass the belts with the material along the bottoms of the, in particular shallow, treatment containers which are provided in this area with openings for the treatment fluid, in particular for the discharge of the treatment fluid.

According to a further development of the invention, a particularly favorable practical embodiment can be obtained by providing for the cross section of the treatment containers to decrease from top to bottom, in particular constantly, in planes in the travel direction of the belts and advantageously the container walls have the shape of a wedge cut off at the edge, optionally with curved flanges. In order to achieve a particularly close control of the supply of treatment medium, the containers have interior spaces divided approximately in the center and are formed closed in the lowermost, in particular flat portion. But is is also conceivable to provide for the container to have spaces for the treatment fluid only within their flanges which are provided with the openings for this treatment fluid. The core space of the containers may be completely free of treatment fluid in this case.

In practice, it may be particularly convenient and the treatment success may be particularly increased if the belts with the material lodged therebetween are made to pass in the area of the maxima and/or minima of the loops and undulations around optionally driven reversing rollers, compression rollers or the like or through optionally driven press nips or the like. The plant is completed by providing, in particular separate, collecting vats or the like for treatment fluid and washing fluid and the like underneath the lateral walls of the treatment containers.

The endless permeable belts provided are for instance perforated steel belts or screen belts made of plastic material whose ends are connected in a suitable manner for instance by welding, weaving or plugging together.

By the arrangement according to the invention, an essentially improved and essentially better controlled treatment of the material by the treatment medium is achieved. The results are a better utilization of the respective treatment medium and thus possibility of an essentially more compact embodiment of the plant, for instance in the form of a treatment module in a conventional plant.

In the same way, an essential reduction of the friction of the belts on the flanges and bottoms of the treatment containers is obtained.

By means of the arrangement according to the invention, there is the possibility of combining various treatment methods in one plant, with a sharper separation of the individual treatment zones than before being possible, as well as the regulation of the consistency of the material prior to treatment. It is well known that a treatment is all the more effective the less liquid is carried along in the material to be treated, meaning that the degree of effectiveness increases with the consistency.

There is finally the possibility of and automatic temperature and/or pH control, in particular upstream of press nips.

The invention is explained by means of exemplary embodiments under reference to the accompanying drawing.

FIGS. 1, 3 and 4 show plants according to the invention with deep treatment containers in diagrammatic side view, FIGS. 3 and 4 only being partial views, FIG. 2 is a modification of the embodiment according to FIG. 1 in detail, FIG. 5 a machine with comparatively shallow treatment containers and FIG. 6 finally a detail of a variant thereto.

According to FIG. 1, the material 1, in particular in the form of a cake or web, is made to pass between the endless permeable belts 2 and 3 to the containers 4 to 6, the belts 2,3 with the material 1 being made to pass in undulations, loops or the like around these containers from underneath along their flanges 7 to 12 by means of the rollers 13 to 19. Further rollers 20 to 25 and 24' and 26 to 29 and 26' are provided for the return of the belts 2,3. As shown in partial view in FIG. 2, parts of rollers or press nips 30, 31 could be installed in the plant instead of the rollers 15, 17 and 19. The stand construction supporting the containers, rollers and the like bears the reference number 32.

The flanges 7 to 12 of the containers are provided with openings through which the treatment fluid, in particular the washing fluid, is introduced under pressure to the belts and the material, as indicated by arrows 33 to 38. In the instant case, the treatment fluid is introduced into narrow containers 39 to 44.

It is important that the treatment or washing zones alternate at the perforates flanges 7 to 12 with interposed or flanking compression zones 13 to 19 and 30, 31 (rollers, compression rollers, press nips).

The treatment fluid passed or pressed through the belts and the material is collected in the containers 45 to 50 and reused if possible, in particular, it is pumped back into the containers 39 to 44.

In the double screen belt scrubber shown, the washing water is forced through the material 1 by means of containers (washing shoes) 7 to 12 more or less pressurized. The use of pressure is essentially more convenient from the viewpoint of energy consumption than the use of vacuum; moreover, at use of pressure, the friction of the belts 2,3 with the containers 7 to 12 is largely relieved by the penetrating resistance of the washing water through the material, while at use of vacuum, this friction is increased. The increased friction in vacuum screen belt washers moreover requires the use of special screens or metal belts.

As shown in the diagrammatic partial views of FIGS. 3 and 4, container shapes of approximately rectangular cross section 51 or of U-shaped cross section 52 are conceivable in addition to the approximately wedge-shaped containers shapes shown in FIG. 1, the container openings 53 being provided only on the container flanges in the one case, while openings 54 are also provided in the bottom, in the other case.

Reverting to FIG. 1, it is to be noted that the treated material, for instance the washed pulp, is discharged from the machine at 55.

By a vertical or oblique arrangement of the individual washing zones in the double screen belt washer, it is also easily possible to arrange a straining or squeezing zone consisting of a belt surface pressure 15, 17 or one or more S-shaped rollers or a nip pressure, i.e. one or more press nips, between each washing zone; this also applies to the embodiments according to FIGS. 3 and 4 where press nips 56, 57 and 58, 59 and compression rollers 60 are installed. By the combination of displacement washing and straining or squeezing, the total effect of the washing operation is increased and the requirement of fresh water (dilution factor) is reduced to a minimum. The reduction of the consumption of fresh water is of great economic significance for the evaporation plants for the washed pulp arranged downstream. The compact construction and reduced belt friction in the washing zones also create the possibility to provide further treatment containers and further treatment media, for instance bleaching chemicals, to be introduced into the material subsequent to the washing operation.

The dehydration of the material 1 starts in a pre-dehydration zone 61 on or at the returning length of the lower belt 3, Following the pre-dehydration zone, a dehydration shoe 62 is arranged to pre-dehdyrate the material 1 to about 10 to 40, in particular about 12 percent. Following this dehdyration zone, there is one or there are more vertical treatment containers 63, 64 and 65, 66 or oblique treatment containers (washing shoes) 7 to 12, one or more reversing rollers or press nips being provided on each washing shoe or between the washing shoes. As already mentioned, the washing water is collected in further containers located underneath the washing zones and serving as pump rundown tanks for the charging of the individual washing zones in the countercurrent process. The treatment material 1 is passed to a discharge means 67 on the discharge side.

It is possible to arrange one or more additional treatment zones which may be used after completion of the washing operation for the introduction of chemicals, for instance for bleaching the material.

As shown in FIG. 5, the treatment containers 68, 69 can also be formed with shallow deth, i.e. very flat and with only slightly curved bottoms 70, 71, the openings 72, 73 for the treatment fluid discharged under pressue being indicated by arrows and distributed over the entire bottom. On the container sides and between the containers 68, 69, there are again reversing rollers or compression rollers 74, 75, so that in this embodiment, as well, the belts with the material lodged therebetween are made to pass along an undulating path, namely through washing zones 70, 71 or the like and straining or squeezing zones 74, 75. The belts in this case bear the reference numbers 76 and 77.

As shown in partial view in FIG. 6, press nips 78, 79 can be provided in the compression zones. The material is designated by 80.

The pressure in the containers can be generated not only by means of pumps, but also statically, for instance by a column of treatment fluid of adequate height in the container and accordingly formed outflow opening.

In the representations shown, the treatment containers are arranged spacially at identical level and one behind the other in travel direction of the belts and the material. The containers according to FIG. 1 can have free interior spaces 81, 82 and 83, which reduces their weight. But it is also possible to provide interior spaces divided in the center from which the openings in the flanges are fed.

We claim:

1. An apparatus for the treatment of a material, including at least two endless belts, means for moving said belts simultaneously, said belts being confronted along at least a portion of their path, means for placing the material between the belts at the confronted portion of their path, at least two stationary containers serving for the reception and discharge of a treatment medium, said containers being spaced from each other and one behind the other horizontally in travel direction of the belts, a roller arranged between the containers for passing the belts with the material being conveyed after passing a single treatment container, means for passing the belts with the material lodged therebetween around said containers and over said roller, said containers being provided with inlets and outlets for said treatment medium, the improvement to said stationary treatment containers comprising: said containers being positioned for passage of said belts around and below said containers; means for feeding said treatment medium from on top of the belts for passage between said belts and the material contained between said belts; said stationary containers defining an outer shape of a wedge, said wedge with a plane of symmetry, said plane being vertically directed and said wedge being arranged with a top upwardly exposed and being provided with a downward cut-off edge with sidewalls extending between said cut-off edge and said top; said belts at said confronted portion of their path being passed from below serially around at least two of the containers and over said at least one roller provided between upper ends of said containers whereby said belt passes in a horizontal, undulating path; said containers being provided on at least part of their sidewalls facing the belts with discharge openings for the treatment medium.

2. The apparatus according to claim 1, wherein there are means for pressurizing the treatment medium and means for transporting said pressurized treatment medium into said treatment containers so that the treatment medium can flow through the discharge container openings to the belts and to the material.

3. The apparatus according to claim 1, wherein the treatment containers are arranged at approximately identical levels spaced from each other and one behind the other in travel direction of the belts with rollers provided between the containers.

4. The apparatus according to claim 1, wherein the belts with the material are additionally passed along the bottoms of the treatment containers; said bottoms of said treatment containers being provided with openings for discharge of the treatment medium.

5. The apparatus according to claim 1, wherein the cross section of the treatment containers decreases from top to bottom.

6. The apparatus according to claim 5, wherein the cross section of the treatment containers decreases constantly from top to bottom.

7. The apparatus according to claim 5, wherein the treatment container walls have the shape of curved sidewalls.

8. The apparatus according to claim 1, wherein the treatment containers are provided with inner spaces divided approximately in the center and formed closed in the lowermost portion.

9. The apparatus according to claim 1, wherein the treatment containers are provided with spaces for the treatment medium only within their sidewalls which are provided with openings for said treatment medium.

10. The apparatus according to claim 1, wherein collecting vats for treatment medium are arranged underneath the sidewalls of the stationary treatment containers.

11. The apparatus according to claim 10, wherein said collecting vats are separate.

12. An apparatus for the treatment of a material including, at least two endless belts, means for moving said belts simultaneously, said belts being confronted along at least a portion of their path, means for placing the material between the belts at the confronted portion of their path, at least two stationary containers serving for the reception and discharge of a treatment medium, said containers being spaced from each other and one behind the other horizontally in travel direction of the belts, a reversing roller between said containers, means for passing the confronted belts with the material therebetween around said containers and over said reversing roller whereby said belt passes in undulation in the horizontal direction; said containers being provided with inlets and outlets for said treatment medium, the improvement to said treatment containers comprising: said treatment containers defining sidewalls having outer surfaces with discharge openings, said containers further defining a flat top side; means for positioning said containers for passage of said belts around and below said containers; means for feeding said medium from above through said containers to the belts; means for passing said belts at the outer surfaces of the sidewalls of said stationary containers; at least two of said undulations being passed from below individually around at least two of the containers; said reversing roller provided between the upper ends of said containers to reverse said belts around said containers; said containers defining on at least part of their sidewalls facing the belts material discharge openings for the treatment medium.

13. The apparatus according to claim 12 and including means for pressurizing the treatment medium and means for transporting said pressurized treatment medium into said treatment containers so that said pressurized treatment medium can flow through the container openings to the belts and the material.

14. The apparatus according to claim 12, including means for supporting said treatment containers at identical levels spaced serially one behind the other in travel direction of the belts.

15. The apparatus according to claim 12, and including means for passing the belts with the material along the bottoms of the treatment containers, said treatment containers bottoms further defining openings for the treatment medium for its discharge.

16. The apparatus according to claim 12, wherein the cross section of the treatment containers decreases from top to bottom.

17. The apparatus according to claim 16, wherein the cross section of the treatment containers decreases constantly from top to bottom.

18. The apparatus according to claim 17, wherein the container walls have the shape of curved sidewalls.

19. The apparatus according to claim 12 and futher including separate collecting vats for said treatment medium; and, means for supporting said collecting vats underneath the sidewalls of stationary treatment containers.

20. An apparatus for the countercurrent displacement washing of a filter cake, said apparatus including at least two endless belts, means for moving said belts simultaneously, said belts being confronted along at least a portion of their path; means for passing the filter cake between the belts at the confronted portion of their path, means for transporting the belts with the filter cake lodged therebetween in undulations arranged side by side in horizontal direction, at least two stationary containers serving for the reception and discharge of a washing medium, said containers being spaced from each other and one behind the other horizontally in travel direction of the belts, a reversing roller arranged between the containers to pass the belts in said undulations around said treatment containers from a single treatment containers to an adjacent treatment container; said containers, being provided with inlets and outlets from said washing medium, the improvement to said treatment containers comprising: sidewalls defining openings in said containers, means for disposing said belts for passage around and below said containers; means for feeding said washing medium through said containers to the top of the belts and to the filter cake, means for passing said belts around said stationary containers in contact with said containers, said containers defining sidewalls having an outer shape of a wedge, said wedge with a plane of symmetry define by said sidewalls, said plane being vertically directed and said wedge being arranged with a top and being provided with a cut-off edge at the bottom; and, said containers defining discharge openings for said washing medium on at leat part of their sidewalls facing the belts and the filter cake.

21. The apparatus according to claim 20, and including means for pressurizing the washing medium and means for transporting said pressurized medium into said treatment containers whereby said washing medium can flow through the container openings to the belts and the filter cake.

22. The apparatus according to claim 20, and further including means for supporting the stationary containers at approximately identical levels spaced from each other and one behind the other in travel direction of the belts with reversing rollers provided between the containers.

23. The apparatus according to claim 20, and further including means for passing the belts with the filter cake along the bottom of the stationary containers, said stationary container bottoms further defining openings for the washing medium.

24. The apparatus according to claim 20, wherein the cross section of the treatment containers decreases from top to bottom.

25. The apparatus according to claim 24, wherein the cross section of the treatment containers decreases constantly from top to bottom.

26. The apparatus according to claim 24, wherein the container walls have the shape or curved sidewalls.

27. The apparatus according to claim 20, wherein the treatment containers are provided with inner spaces divided approximately in the center and formed closed in the lowermost portion.

28. The apparatus according to claim 20, wherein the containers are provided with spaces for the washing medium only within their side walls, said sidewalls provided with openings for discharging said washing medium.

29. The apparatus according to claim 20, wherein collecting vats for washing medium are arranged underneath the sidewalls of the stationary treatment containers.

30. The apparatus according to claim 29, wherein said collecting vats are separate.

31. An apparatus for the treatment of a material comprising: at least two endless belts, means for moving said endless belts simultaneously, said endless belts being confronted along at least a portion of their path, means for lodging the material between the endless belts at the confronted portion of the path of said belts, means for passing the belts with the material lodged therebetween in undulations arranged side by side in horizontal direction, at least two stationary containers serving for the reception and discharge of a treatment medium, said stationary containers being spaced from each other and one behind the other horizontally in travel direction of the belts, a first said stationary container being disposed in a first undulation and a second said stationary container being disposed in a second undulation, a compression roller arranged between the containers for turning the belts with the material being conveyed between said stationary containers, said stationary containers being provided with inlets and outlets for said treatment medium, said stationary containers defining a flat top side and sidewalls, said stationary containers being disposed for passage of said belts around and below said containers in said undulations, means for feeding said medium through said containers to the belts, means for passing said undulations at the outer surfaces of the side walls of said stationary containers, said stationary containers defining discharge openings for the treatment medium on at least part of their sidewalls facing the belts whereby and, said sidewalls contacting and guiding the upper belts of said belts.

32. The apparatus according to claim 31, and including means for pressurizing the treatment medium; means for transporting said pressurized medium into said stationary containers whereby said treatment medium can flow through the stationary container openings to the belts and the material.

33. The apparatus according to claim 31, means for supporting the stationary containers at approximately identical level spaced from each other and one behind the other in travel direction of the belts.

34. The apparatus acording to claim 31, means for passing the belts with the material along the bottoms of the startionary containers; said stationary containers defining at the bottoms openings for the treatment medium discharge.

35. The apparatus according to claim 31, wherein the cross section of the treatment containers decreases from top to bottom.

36. The apparatus according to claim 35, wherein the cross section of the treatment containers decreases constantly from top to bottom.

37. The apparatus according to claim 35, wherein the container walls have the shape of curved sidewalls.

38. The apparatus according to claim 31, wherein in particular separate collecting vats for treatment medium are arranged underneath the sidewalls of stationary containers.

39. An apparatus for the countercurrent displacement washing of a filter cake comprising: at least two endless belts, means for moving said belts simultaneously, said belts being confronted along a portion of their path, means for passing the filter cake between the belts at the confronted portion of said path, means for transporting the belts with the filter cake lodged therebetween; at least two stationary containers serving for the reception and discharge of a washing medium, said stationary containers being spaced from each other and one behind the other horizontally in travel direction of the belts, means for disposing said containers for passage of said belts around and below said containers in undulations; means for feeding said washing medium for the top through said containers and to the belts and to the filter cake; means for passing said undulations at the outer surfaces of the side walls of said stationary containers whereby said sidewalls contact and guide the upper belt of said belts; at least two of said undulations being passed from below individually around at least two of the containers; at least one reversing roller provided between the upper ends of said containers for receiving and reversing said belts and filter cake around said container; said containers defining on at least part of their sidewalls facing the belts discharge openings for the washing medium.

40. The apparatus according to claim 39, and including means for pressurizing the washing medium; means for transporting said pressurized medium into said treatment containers whereby said treatment medium can flow through the container openings to the belts and the filter cake.

41. The apparatus according to claim 39, wherein the treatment containers are arranged at approximately identical levels spaced from each other and one behind the other in travel direction of the belts.

42. The apparatus according to claim 39, wherein the belts with the filter cake are additionally passed along the bottoms of the treatment containers; said bottoms of said containers defining openings for the washing medium for its discharge.

43. The apparatus according to claim 39, wherein the cross section of the treatment containers decreases from top to bottom.

44. The apparatus according to claim 43, wherein the cross section of the treatment containers decreases constantly from top to bottom.

45. The apparatus according to claim 43, wherein the container walls have the shape of curved sidewalls.

46. The apparatus according to claim 39, and further including separate collecting vats for treatment medium are arranged underneath the sidewalls of stationary treatment containers.

* * * * *